United States Patent
Nakamura

(10) Patent No.: US 6,600,613 B1
(45) Date of Patent: Jul. 29, 2003

(54) DEMODULATION OF MAGNETICALLY RECORDED DATA

(75) Inventor: Hiroshi Nakamura, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/456,939

(22) Filed: Dec. 7, 1999

(30) Foreign Application Priority Data

Dec. 10, 1998 (JP) .......................................... 10-350854

(51) Int. Cl.[7] ................................................ G11B 5/09
(52) U.S. Cl. ...................................... 360/29; 340/146.2
(58) Field of Search .............................. 360/29, 2, 45, 360/53; 235/449; 340/146.2

(56) References Cited

U.S. PATENT DOCUMENTS

| | | | |
|---|---|---|---|
| 4,852,105 A | * 7/1989 | Kurz | 371/69 |
| 5,285,328 A | 2/1994 | Behr et al. | |
| 5,298,897 A | * 3/1994 | Harrison et al. | 341/71 |
| 5,452,143 A | * 9/1995 | Kamagami | 235/449 |
| 5,546,462 A | * 8/1996 | Indeck et al. | 380/23 |

* cited by examiner

Primary Examiner—David Hudspeth
Assistant Examiner—Varsha A. Kapadia
(74) Attorney, Agent, or Firm—Reed Smith, LLP

(57) ABSTRACT

There is disclosed a pattern matching technique for comparing (a) signals representing detected magnetically recorded characters against (b) a set of predetermined idealized reference signals representing those characters. The pattern matching techniques involves a correlation of coefficients. The characters are encoded as data in the form of binary signals in which one type of bit has a greater width and the other type of bit has a lesser width. Techniques are disclosed to compensate for various distortions in the demodulated characters from the magnetic stripe. These distortions may be due to a loss of magnetic head resolving power, contamination and scratches on the magnetic medium and equipment drift. Techniques are disclosed for normalizing the width of each segment that corresponds to a character. Techniques are also described for detecting the starting point of the segment that represents a character. A technique is described to avoid errors due to abnormal signal peaks.

16 Claims, 11 Drawing Sheets

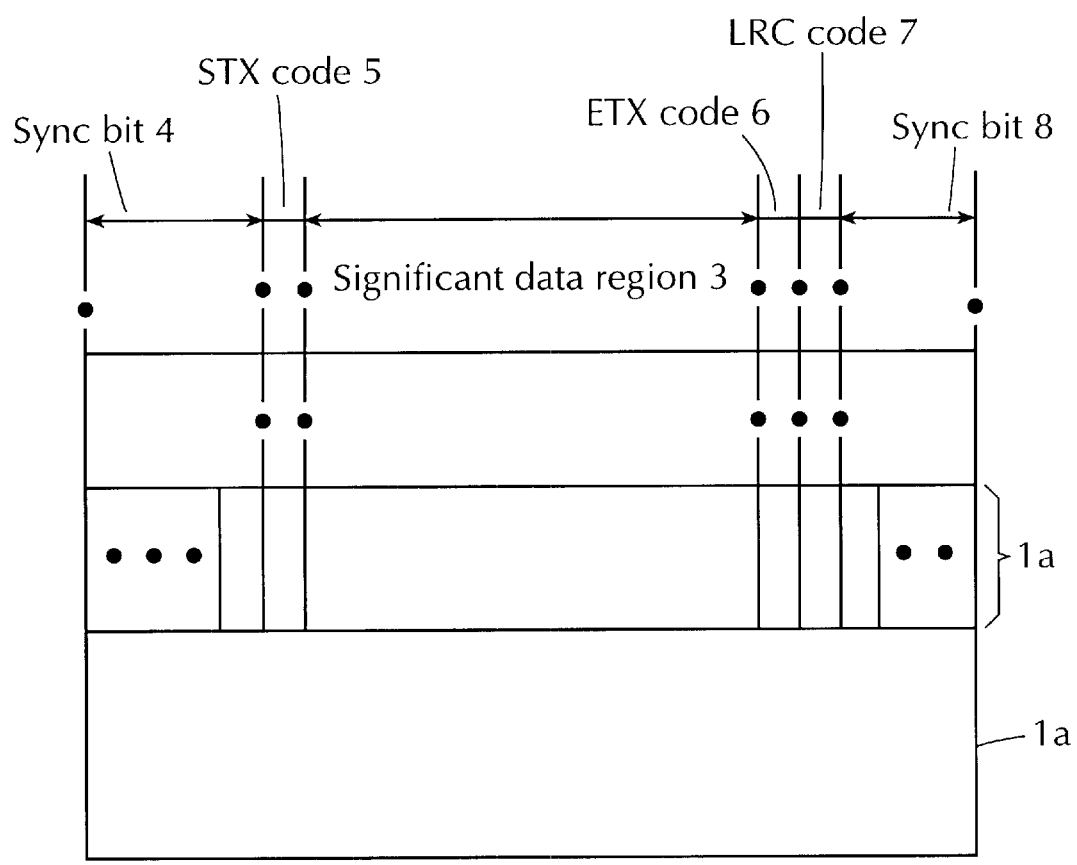

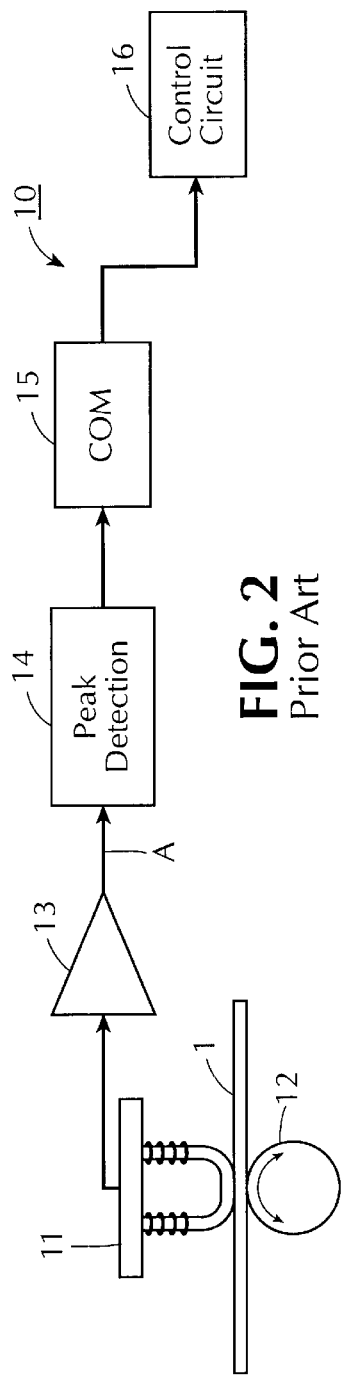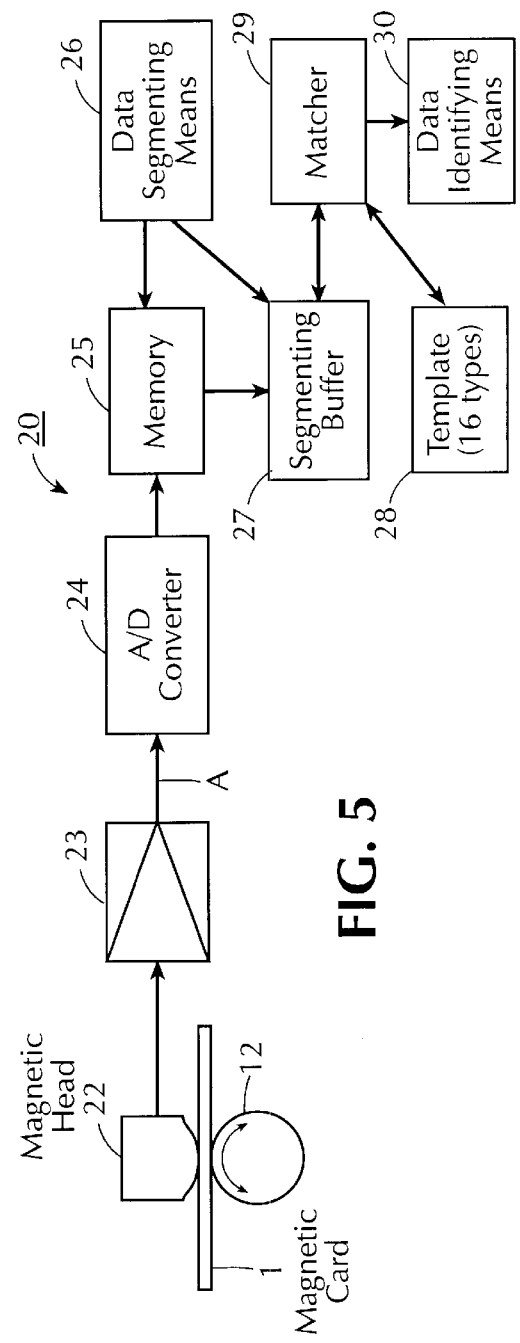

F2F Modulation Method

Example of false reading caused by extra peak

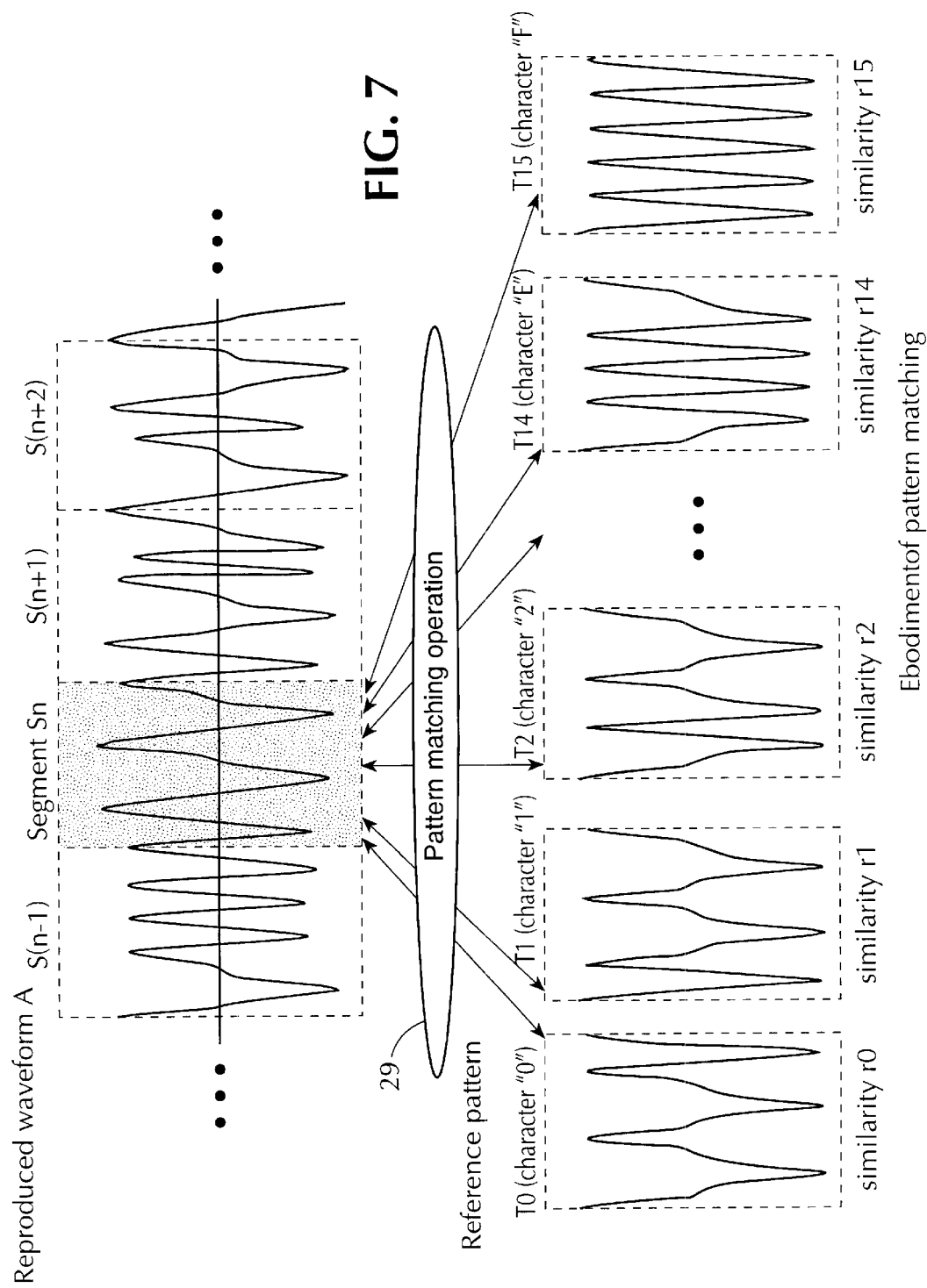

Method for detecting data starting region

Detection of segment boundary point

Three types of cleaving positions

Reference pattern

Matching check of segment boundary

DEMODULATION OF MAGNETICALLY RECORDED DATA

BACKGROUND OF THE INVENTION

The present invention relates to a method for demodulating magnetically recorded data recorded, for example, on cards having a magnetic stripe. It specifically relates to a method for demodulating magnetically recorded data, in which the recorded data can be accurately reproduced through a technique of pattern matching.

A data recording method normally used for magnetic cards is a pulse width modulating method in which data is recorded by a combination of two types of pulses, F and 2F. In recording/reproducing devices such as magnetic card readers that use such a method, a magnetic head is slid relative to a magnetic stripe on a magnetic card to reproduce magnetically recorded data in a form of an analog reproduced signal, and based on the waveform of the analog reproduced signal, the binary data is demodulated, that is, decoded.

Describing in detail, as illustrated in FIG. 1, on a magnetic stripe (magnetic recording surface) 1a of a general magnetic card 1, a sync bit region 4 and a STX (start of text) code region 5 that indicates the beginning of the recorded data are formed before a significant data region 3 in which actual data is contained, and an ETX (end of text) code region 6 that indicates the end of the data, an LRC (longitudinal redundancy check) data region 7, and a sync bit region 8 are formed after the significant data region 3.

As illustrated in FIG. 2, a magnetic card reader 10 for reproducing magnetically recorded data configured in the above manner transports the magnetic card 1 by a transport roller while a magnetic head 11 contacts the magnetic stripe on the magnetic card 1, and whereby the analog reproduced signal corresponding to the magnetically recorded data on the magnetic stripe is obtained.

As illustrated in FIG. 3(a), a recording current waveform for magnetic recording is composed of a combination of pulse signals representing data in binary form. The "zero" bit is represented by the longer pulse width and the "one" bit is represented by the shorter pulse width; in which the shorter pulse width is one half the width of the "zero" bit pulse width. FIG. 3(a) illustrates the binary number "000010".

The signal waveform of an analog reproduced signal A obtained by the magnetic head 11 via an amplifier 13 is illustrated in FIG. 3(b) in which rising and dropping points of the recording current waveform appear as positive and negative peaks. The positive and negative peaks of the waveform appear in inverse magnetic polarities of the magnetically recorded data. The analog reproduced signal waveform is supplied to a peak detecting circuit 14 (see FIG. 2) to identify peak positions. Further, through a comparator 15 a digital reproduced signal waveform which corresponds to the recording current waveform as illustrated in FIG. 3(d) is obtained. Based on the digital reproduced signal waveform, the magnetically recorded data is decoded by a control circuit 16 consisting of CPU.

In general use, there are a binary data character code form employing a 5-bit code system (4 data bits and 1 parity bit) or a 7-bit code system (6 data bits and 1 parity bit). Since they can be used substantially in the same manner, the embodiment will be described based on the 5-bit code system.

In the 5-bit code system, sixteen kinds of characters "0"~"F" can be expressed. There are odd parity and even parity for the parity bit. In the control circuit 16, bit lines that correspond to the sixteen kinds of characters are pre-stored in memory, and the reproduced binary data is compared by 5 bits with the bit lines to reproduce the data.

PROBLEMS TO BE SOLVED

The data reading performance of a recording/reproducing device for a magnetic card, for example, is affected by the condition of the magnetic recording medium, contamination and wear of the magnetic head, mechanical noise, etc.

A magnetic card, which is a magnetic recording medium, generally receives various stresses over repetitive use. Due to contamination or scratches on the recording surface of the magnetic card, for example, the signal reproduced by the magnetic head may present the waveform including peaks that do not exist originally. Also, the magnetization on the recording surface tends to degrade over time. It is especially likely that the magnetic recording medium used for many years after manufacturing loses the magnetic intensity which is necessary for signal reproduction.

Furthermore, as the magnetic head wears out, its resolving power decreases, possibly causing peak shifts in the waveform of the reproduced signal. Also, the peak positions may be shifted depending on the frequency property of the reproducing circuit.

In a conventional reproducing method, the peaks of the analog reproduced signal waveform are detected, based on which binary data is identified as "0" or "1". To avoid the influence of peak shift, as illustrated in FIG. 4(a), a constant reference time $\alpha T$ (i.e., $\alpha=0.7$) is set with respect to a time interval T of the reproduced signal waveform which is equivalent to 1-bit of the binary data. The data bit "0" or "1" is determined by observing whether the inversion of the signal polarity exists within the reference time.

In the conventional method, however, when abnormal peaks (not corresponding to the recorded data) appear in the reproduced signal waveform due to the influence of noise, etc., the recorded data cannot be read accurately, resulting in inaccurate regeneration of the recorded data.

As illustrated in FIG. 4(a), for example, when the character code expressed by the 5-bit code system is recorded, if abnormal peaks as shown by a solid line in FIG. 4(b) appear, the original character code "10000" is reproduced as "10011".

Considering the above problem, an object of the present invention is to provide a technique for demodulating magnetically recorded data in which, even when abnormal peaks appear in the reproduced signal waveform, the magnetically recorded data can be accurately reproduced.

BRIEF DESCRIPTION OF THE DISCLOSURE

In brief, this invention is directed to a pattern matching technique of comparing detected magnetically recorded characters from a magnetic stripe against a set of predetermined idealized reference signals representing characters. Based on the greatest degree of correlation, the appropriate reference character is designated as the character represented by the detected character.

The detected signal is divided into a plurality of segments, each segment has a width equal to one character. In order to compensate for distortions, each signal segment being tested is composed not only of the target segment but also slightly shifted segments. The one of the reference characters which correlates most highly with any one of the related segments is the character designated as the one represented by the signal segment. Techniques for detecting the segment starting position and for normalizing the segment width are also employed to enhance accuracy of character designation.

BRIEF DESCRIPTION OF THE FIGURES

FIG. 1 is a schematic showing of a recorded portion of a magnetic card.

FIG. 2 shows a configuration of a conventional card reader.

FIG. 5 is a flow diagram of a card reader incorporating the present invention.

FIG. 7 schematically illustrates pattern matching in the data decoding of the card reader of FIG. 5.

DESCRIPTION OF THE PREFERRED EMBODIMENTS

Figure 3A:
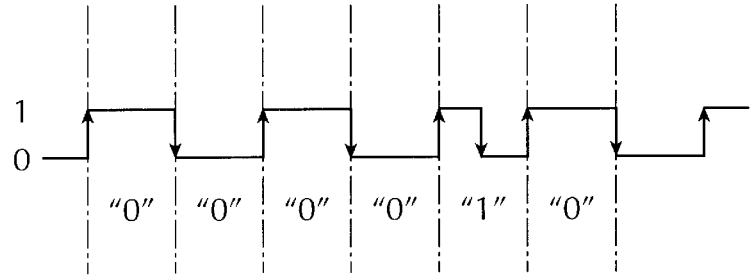
FIGS. 3(a)–3(d) show signal waveforms to describe a data demodulating operation of the card reader of FIG. 2.

A card reader for magnetic cards which reproduces magnetically recorded data by a method for demodulating the magnetically recorded data of the present invention will be described referring to the drawings.

FIG. 5 is a block diagram showing a configuration of a card reader of the present invention. A card reader 20 is for reproducing the data magnetically recorded in the 5-bit code system as illustrated in FIG. 1 from a magnetic card.

Figure 3B:
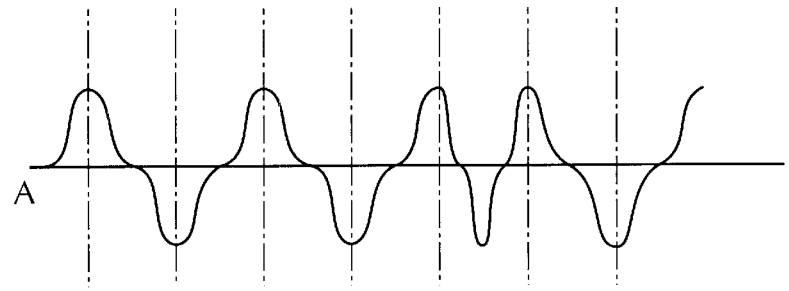
Figure 3C:
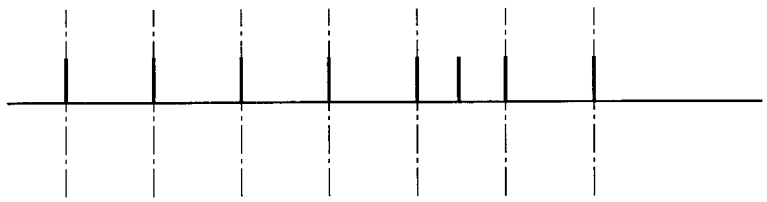
Figure 3D:
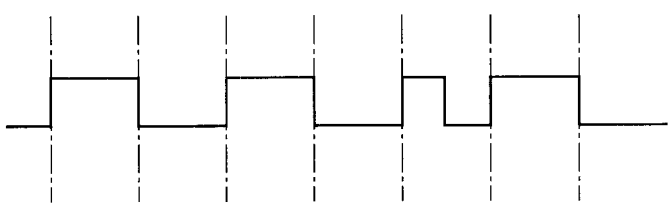
Figure 4A:
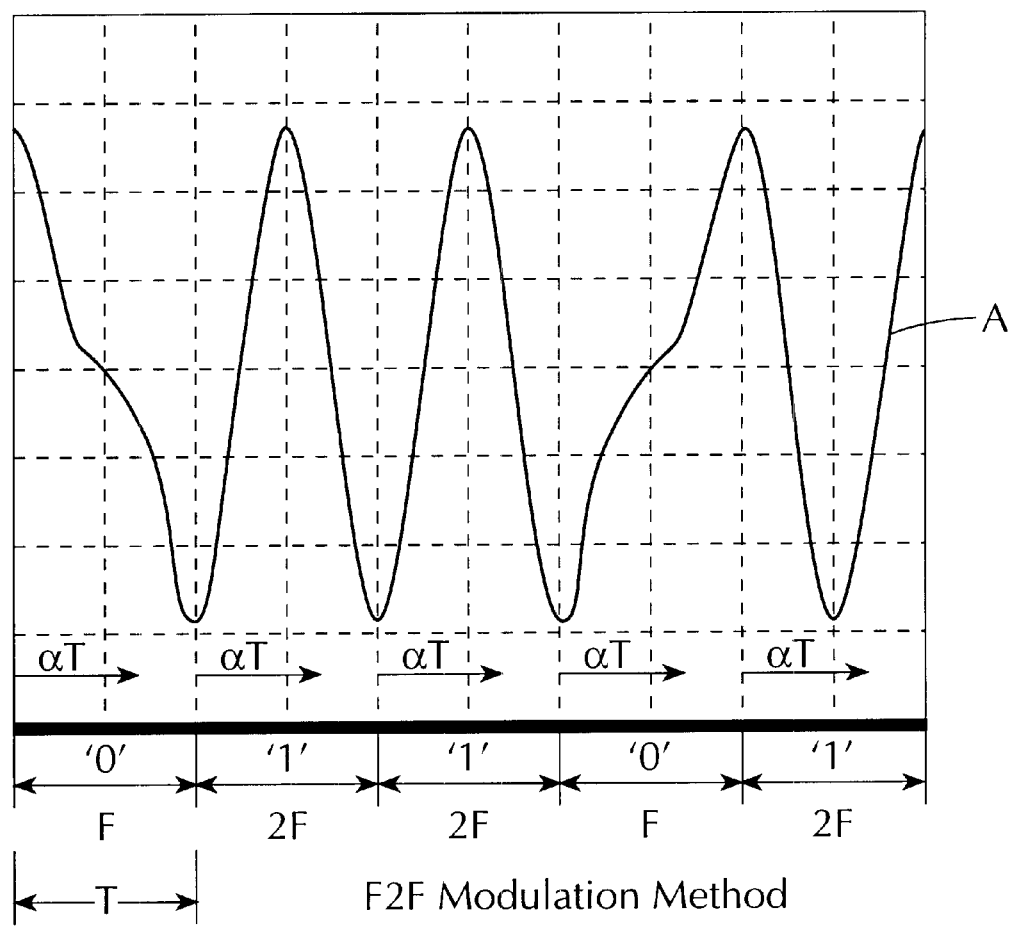
FIGS. 4(a) and 4(b) shows reproduced signal waveforms to describe problems in a conventional data demodulating method.
Figure 4B:
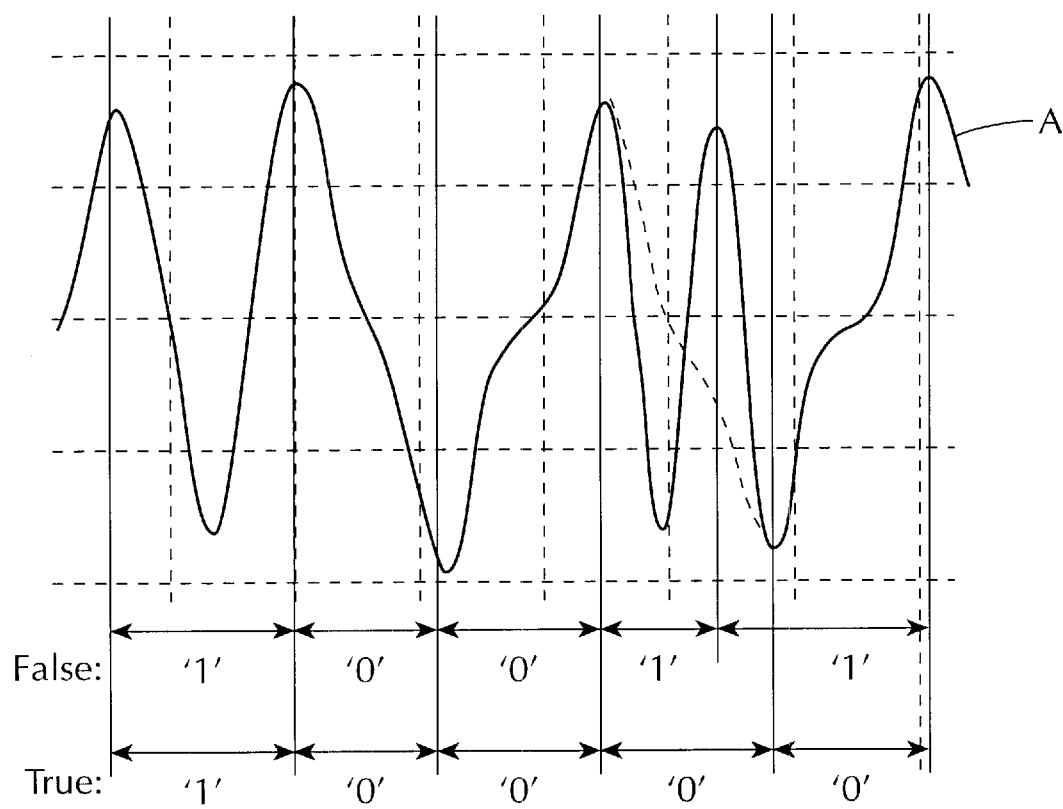

The card reader 20 is equipped with a transporting roller 21 (simplified in the figure) for transporting a magnetic card 1, which is a subject to be read (see FIG. 1). The magnetic card 1 is transported by the transporting roller 21 while a magnetic head 22 for reproduction (regeneration) contacts a magnetic recording surface (a magnetic stripe) thereof. The signal obtained by the magnetic head 22 is an analog reproduced signal A as illustrated in FIG. 3(b) which is first amplified via an amplifier 23 and then input to an A/D converter 24. The reproduced digital signal stored in the memory 25 is divided into segments, each of the segments corresponds to a single character code. This division is created under the control of the data segmenting means 26 and the segments are temporarily stored in the buffer 27.

In a template 28, the data of ideal reference waveforms that correspond to the data of sixteen kinds of character codes is pre-stored in memory. A matcher 29 performs pattern matching for the segment data contained in the buffer 27 with that of the sixteen kinds of reference waveform data stored in memory in the template 28, using correlation coefficients. The segment data obtained by pattern matching and the correlation coefficient of each reference waveform data are supplied to a data identifying means 30.

In the data identifying means 30, the greatest correlation coefficient is determined among the supplied correlation coefficients, and the character code data corresponding to the greatest correlation coefficient is allocated to the segment data. In other words, the character code is allocated as the reproduced data which is to be demodulated.

Note that the primary construct portion of this embodiment can be made up of micro computers; under the control of a CPU, the control program stored in ROM is run by using the RAM work space so that each of the above means, that is, data segmenting means 26, matcher 29, and data identifying means 30 can be operated like software. Also, the areas of RAM can be allocated for the memory 25 and buffer 27, and the area of ROM can be used for the template 28.

Pattern Matching Operation

Figure 6:
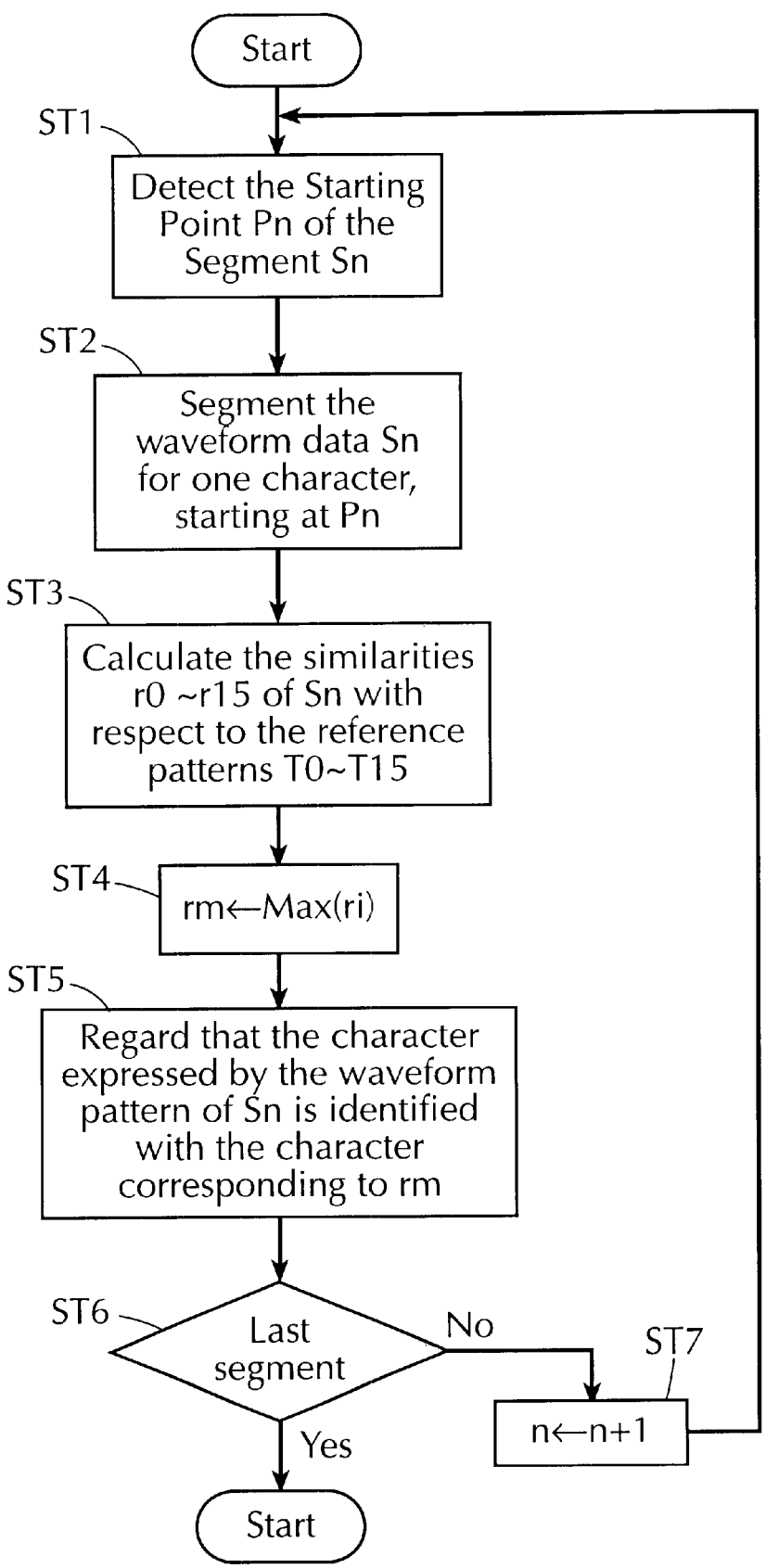
FIG. 6 is a flowchart describing major operations of the data demodulating operation of the card reader of FIG. 5.

FIG. 6 is a flow chart showing a major portion of a data demodulating operation by the card reader 20 of this embodiment. FIG. 7 is a descriptive diagram showing a pattern matching operation in the data demodulating operation. The operation of the card reader 20 of this embodiment will be described referring to these figures.

First, to pick a segment Sn out of a reproduced signal waveform A as illustrated in FIG. 7 by using peaks that appear every 5 bits as the starting points, a starting point Pn (n: positive integer) for the segment Sn is detected (Step ST1 in FIG. 6). Next, starting from the detected starting point Pn, the segment Sn of the reproduced signal waveform for one character code is selected (Step ST2 in FIG. 6).

Then, the segment Sn is compared with reference waveform patterns "T0"–"T15", some of which are illustrated in FIG. 7. These sixteen kinds of the reference waveform patterns are pre-stored in memory. The reference patterns "T0"–"T15" respectively corresponds to the sixteen characters "0" "1" "2" - - - "F". The segment "Sn" is compared with each of the sixteen reference waveform patterns "T0"–"T15" by pattern matching to provide correlation coefficients "r0"–"r15" for the segment "Sn" with respect to each of the reference waveform patterns. These correlation coefficients are calculated by the relationship expressed in the following equation (Step ST3 in FIG. 6).

$$rk = \frac{\sum (Sn_i - Sn_m)(Tk_i - Tk_m)}{[(\sum (Sn_i - Sn_m))^2]^{1/2} [(\sum (Tk_i - Tk_m))^2]^{1/2}}$$

where k=0 . . . 5

$Sn_i = (Sn_1 \ldots Sn_n)$ $Tk_i = (Tk_1 \ldots Tk_n)$ $Sn_m$ and $Tk_m$ respectively represent the averages of $Sn_i$ and $Tk_i$ $-1.0 \leq rk \leq 1.0$ After that, the greatest correlation coefficient "rm", is found among the calculated correlation coefficients (Step ST4 in FIG. 6). Note that, when the polarity of the starting peak point of the segment "Sn" differs from that of the starting peak (point) of the reference waveform pattern to which the segment "Sn" is compared, the greatest correlation coefficient "rm", may possibly be a negative value. Therefore, the absolute value of the greatest correlation coefficient is used for similarity. Then, the character corresponding to the reference waveform pattern, from which the greatest correlation coefficient "rm", is obtained, is allocated to the segment "Sn".

Each of the above operations (Steps ST1–ST5 in FIG. 6) is carried out for each of the segments "Sn" picked out of the reproduced signal waveform "A", and the operation ends after finishing the operation on the last segment.

Method for Detecting Significant Data Starting Position

Next described is a method for detecting the first position of segment "Sn" from the reproduced signal waveform "A" (Operation in Step ST1 in FIG. 6).

As described referring to FIG. 1 the sync bit region of fixed bit line and STX code region are formed before the significant data region, in which data characters are written, on a track of the magnetic stripe 2 of the magnetic card 1. A bit pattern of a single frequency "000 - - - " is recorded in the sync bit region, and a bit pattern in the STX code region is "11010".

Figure 8A:
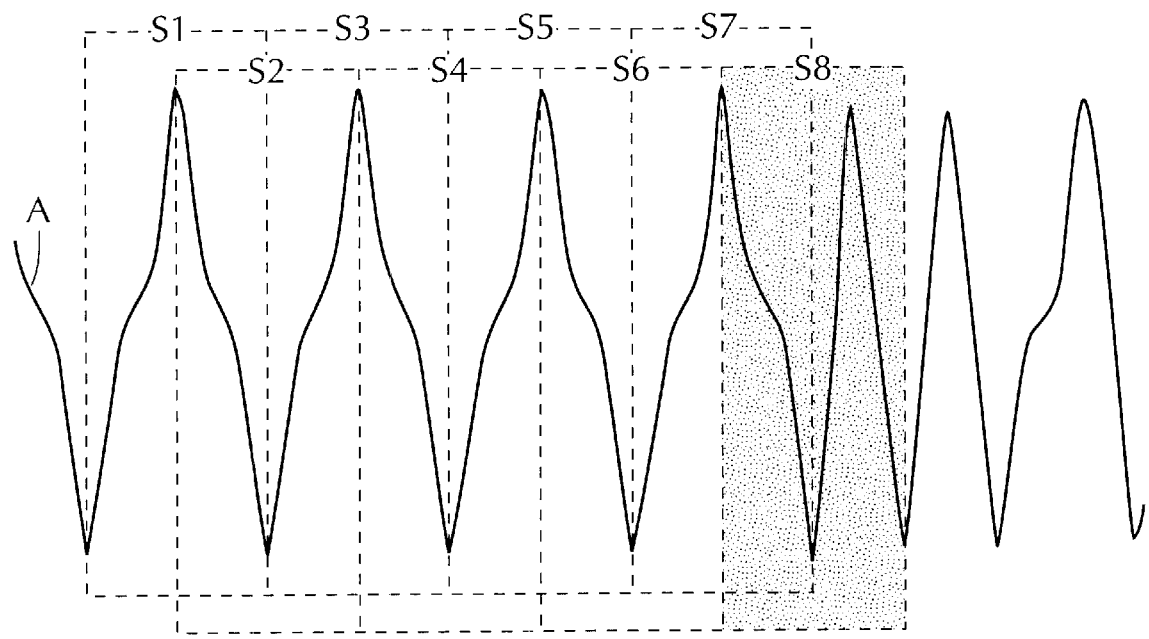
FIG. 8(a) shows a signal waveform of a part of the reproduced signal waveform.
Figure 8B:
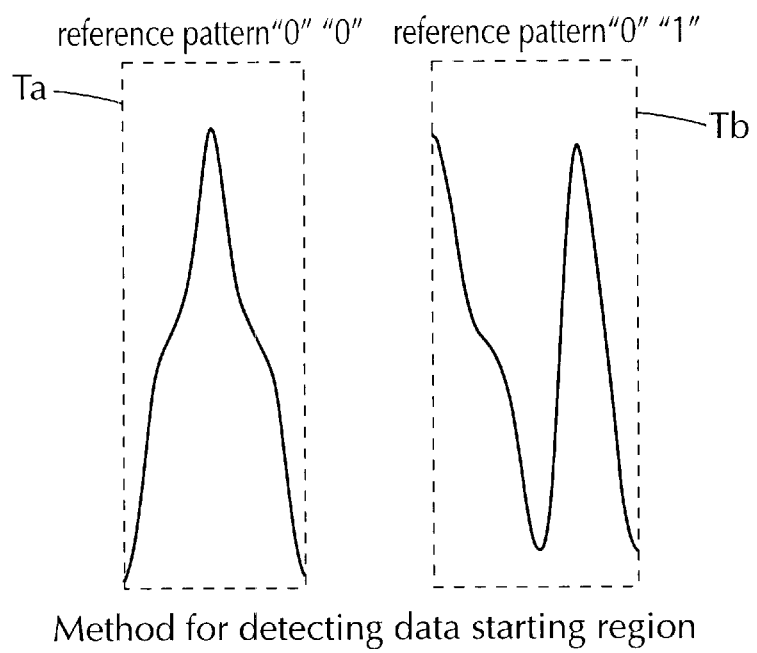
FIG. 8(b) shows signal waveforms of 2-bit reference signal waveform patterns, which are employed for detecting a starting region of the recorded data for pattern matching.

Therefore, the sync bit is "0", and the first bit of the STX code that indicates the beginning (bit) of the data is "1". In this embodiment, as illustrated in FIG. 8(b), herefore, a data, Ta, which corresponds to a bit line "0""0" and a data, Tb, which corresponds to a bit line "0""1" are prepared as the reference waveform data and stored in memory in the template 28.

The matcher 29 performs the step of detecting the first position of a "segment" by employing a two bit unit and shifting the two bit unit by a single bit in order to obtain a set of overlapping two bit units which overlap each other by one bit. In other words, as FIG. 8(b) shows, the pattern matching proceeds as S1, S2, S3, S4 through S7 and S8. In this case, the seven 2-bit segments S1 through S7 show high similarity with the pattern Ta (the bit line is "0""0"). and low similarity with the pattern Tb (the bit line is "0""1"). Consequently it is detected that only sync bits exist in the 2-bit segments S1 through S7.

On the other hand, the 2-bit segment S8 is reversed in high and low similarity relationship, that is, the similarity with the pattern Tb is high. Thus, the 2-bit segment S8 is identified with the bit line "0" "1". As a result, the first (starting) bit with which the data region starts is detected.

The data starting bit can be detected in the above manner. Based on the detection, the following reproduced signal waveform that corresponds to the successive recorded data can be segmented by 5 bit widths, that is, by segment "Sn" (see FIG. 9) that corresponds to each character. Therefore, the reproducing operation by pattern matching can be performed accurately.

Method for Detecting Segment Starting Position in Significant Data

It is important to accurately obtain a starting point for each segment "Sn" in the significant data region to ensure the accuracy of data identification by pattern matching. In this embodiment, the starting point for each segment "Sn" is detected in the following manner (Steps ST1 and ST2 in FIG. 6).

Suppose that the starting peak (point) "Pn" in the reproduced signal waveform of the segment "Sn" is accurately obtained and the data identification for the segment "Sn" is finished correctly. In this case, the starting point "P(n+1)" for the segment "S(n+1)" can be obtained by the following process.

Figure 9:
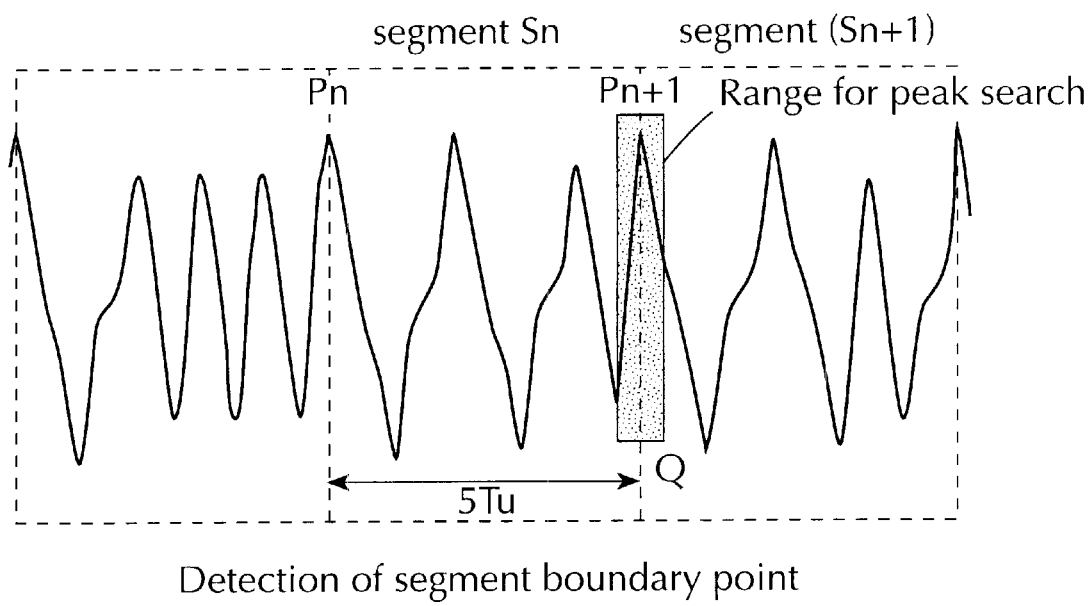
FIG. 9 shows a signal waveform employed in the pattern matching for detecting a boundary point of a segment of the reproduced signal waveform.

As seen by referring to FIG. 9, when "Tu" is a logical data length (time length) for the portion of the reproduced signal waveform corresponding to 1-bit, the segment length constituting one character by 5 bits is "5Tu". Suppose that the data of "5Tu" is, for example, divided in 300 points of equal time interval and the data for each segment "Sn" is defined by the digital data of 300 points.

First, a point "Q" which is "5Tu" ahead, i.e., 300 points ahead, from the starting peak "Pn" of the segment "Sn" is obtained. Next, with respect to a region including several points before and after the point "Q" as the center, the data of the segments "Sn" and "S(n+1)" are scanned to obtain the point "Qx", which shows the greatest value.

Then, the difference "D" between the values of the point "Qx" and the point "Pn" is calculated. When the difference "D" is within a predetermined range and the value of the point "Qx" and that of the point "Pn" are of the same polarity, the value of the point "Qx" is set to be the starting point of the segment "S(n+1)", that is, the point "P(n+1)".

On the other hand, when the difference "D" is out of the predetermined range or the value of the point "Qx" and that of the point "Pn" are of opposite polarities, it can be determined that an abnormal waveform exists in the reproduced signal waveform around the boundary between the segment "Sn" and "S(n+1)". In this case, the point "Q" is used as the starting point for the segment "S(n+1)".

Another Embodiment Method for Segmenting

In the above description, it is supposed that each of the segments "Sn" is made up of 5 bits, which constitutes each character in the significant data, is given the same data length (the same time width). However, the actual data length of the segment "Sn" varies due to variations in speed of transporting the magnetic card 1 or slipping of the magnetic card when transported. Consequently, if the segment data picked out by dividing the waveform into segments of a predetermined time width is used, the accuracy of pattern matching may be degraded.

Figure 10A:
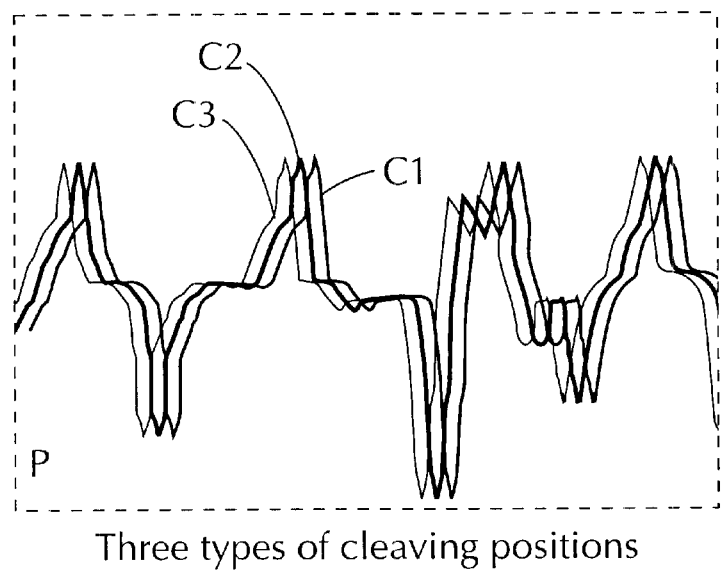
FIG. 10(a) shows a signal waveform diagram of the signal waveforms obtained as a signal segment point is shifted forward and backward when the data length of the segment from the reproduced signal waveform is different from that of a reference signal waveform pattern in the pattern matching,.
Figure 10B:
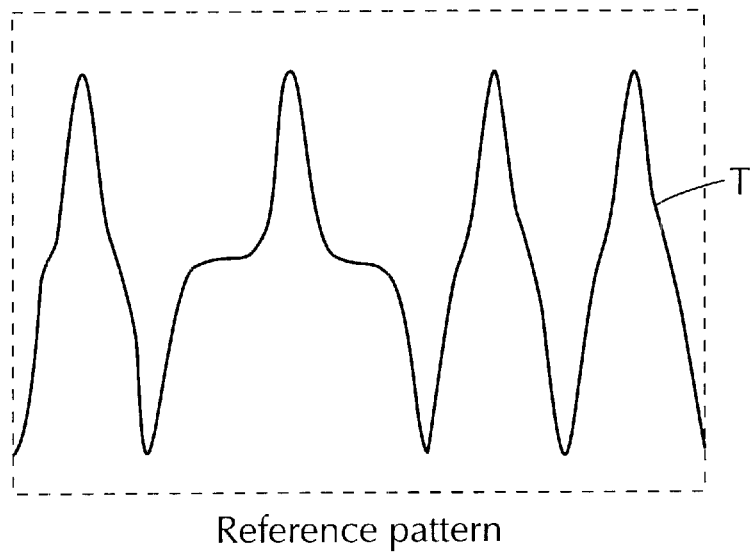
FIG. 10(b) shows a signal waveform diagram of the reference signal waveform pattern.

FIG. 10(a) shows three examples of waveforms which are obtained when the single (same) segment data is shifted forward and backward in time. FIG. 10(b) shows the reference waveform data pattern to which the segment data ought to correspond. Describing in detail, the waveforms "C1" through "C3" in FIG. 10(a) are defined as follows.

"C1": a waveform picked out starting from the peak point "P", at left end (standard waveform).

"C2": a waveform picked out starting from the position that is shifted 20 points behind the peak point "P".

"C3": a waveform picked out starting from the position that is shifted 40 points behind the peak point "P".

The segment in the figure is an example in which the time width is wider than that of the reference waveform data pattern. Therefore, the segmented data of the waveform "C1" ends before the peak in the next segment. Consequently, the waveform "C1" and the reference waveform data pattern "T" greatly disagree with one another even in the normal portion of the waveform. This gives an expectation that the resulting similarity will be a lower value than original. Also, the waveform "C3" includes the peak of the next segment of the data. Since the segmenting starts at the position, several points after the peak point of the standard starting point, it is also expected that the similarity with the reference waveform data pattern "T" will be low. On the other hand, the waveform "C2" is positioned between the waveforms "C1" and "C3"; therefore, the similarity with the reference waveform data pattern "T" is expected to be high compared to the waveforms "C1" and "C3".

Thus, it is desirable to perform the final judgment on the data by not limiting the dividing point for each segment to one position, but by specifying the dividing point with which the similarity becomes the greatest by shifting the dividing point by several points before and after the reference position, and using the result obtained with the specified dividing point.

Note that how to pick the waveforms "C1" through "C3" up doesn't limit the above described embodiment.

Further Embodiment of Method for Segmenting

A method for selecting the segments Sn from the reproduced signal waveform is carried out in such a basic manner that a starting point of the recorded data in the reproduced signal waveform is detected and each segment "Sn" is determined by the time width which corresponds to the 5-bit data from the detected starting point. In the embodiment described, referring to FIG. 9, the position of each segment "Sn" is corrected so that a peak position in the reproduced signal waveform is used.

As described, when the range for each segment "Sn" is determined from a peak to the next peak of the reproduced signal waveform, the length of each segment "Sn" may differ from that of the reference waveform data pattern with which the segment "Sn" is to be compared. In other words, the number of points of two waveforms many not be the same. Therefore, when the number of points are not the same, it is required to compress or decompress the data of the segment "Sn" so that the number of points matches with that of the reference waveform data pattern.

The correction of the data length is performed in the following manner. If "Ns" is the number of points of a target segment "Sn" and Nt is the number of points of the reference waveform data pattern, i) when "Ns" is greater than "Nt", ("Ns"≧"Nt") points are deleted from the segment "Sn"; ii) when "Ns" is smaller than "Nt", ("Nt"≧"Ns") points are added to the segment "Sn".

For the case of the above i), when "Nd", the number of points to be deleted, is ("Ns"–"Nt") and "Wd" is Ns/Nd, the data is deleted one by one from the data of the segment for every other "Wd". For example, when "Nt"=20 and "Ns"= 30, "Nd"=10 and "Wd"=3; therefore, the 3rd, 6th, 9th, 12th, 15th, 18th, 21st, 24th, 27th, and 30th data are deleted from the data of the segment "Sn". Consequently, the data length of the segment "Sn" can be made the same as that of the reference waveform data pattern without changing the characteristics of the pattern thereof.

For the case of the above ii), when the "Na", the number of the data to be added, is ("Nt"–"Ns") and "Wa" is Ns/Nd, the data is added one by one to the data of the segment for every other "Wa". For example, when "Nt"=20 and "Ns"= 15, "Na"=5 and "Wa"=3; therefore, after (or before) the 1st, 4th, 7th, and 13th data of all the data of the segment "Sn", the same data as the above data are added. Consequently, the data length of the segment "Sn" can be made the same as that of the reference waveform data pattern without changing the characteristics of the pattern thereof.

Method for Determining Matching of Segment Boundary Segments

If an error occurs in segmentation by which each segment "Sn" is picked out from the reproduced signal waveform, the data identification is affected for each of the segments after the false segmentation. Therefore, a highly accurate reproduction of the recorded data cannot be expected.

Figure 11:
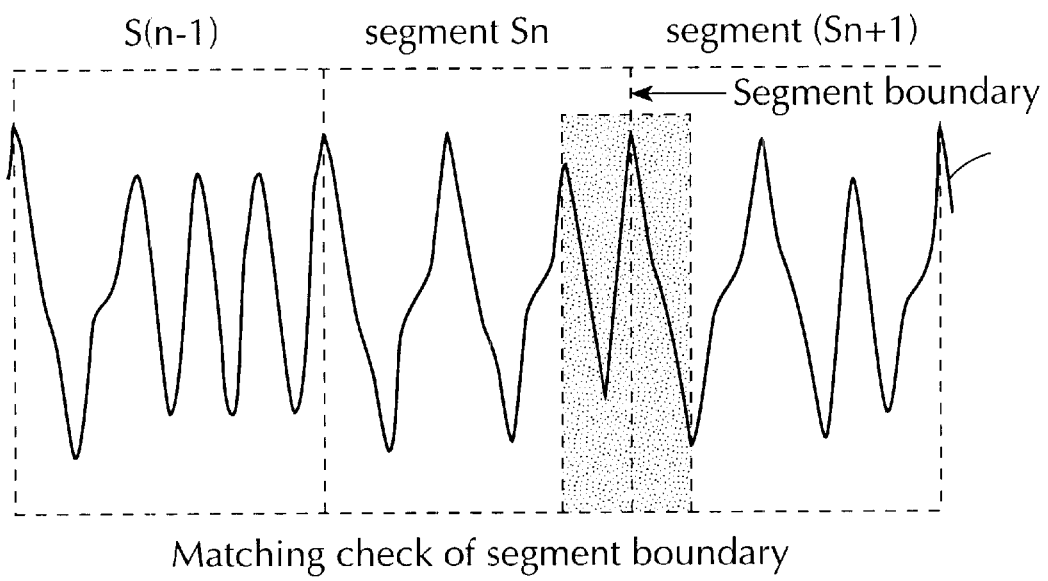
FIG. 11 is a signal waveform diagram of an example of a method of determining the matching degree at the boundary portion of the segments from the reproduced signal waveform in the pattern matching.

By ensuring matching in the segment boundary portion, properly performed segmentation will occur. The pattern matching can also be used for this. Referring to FIG. 11, a method for determining the matching of the segment boundary portion will be described.

First, the pattern matching is performed on a segment "Sn", and the bit data pattern "00001" of the segment "Sn" is decoded. Next, the pattern matching is also performed on the successive segment "S(n+1)" in the same manner and the bit data pattern "00010" thereof is decoded. The pattern matching for the segments "Sn" and "S(n+1)" is performed by the aforementioned method.

In this embodiment, the bit pattern "1" "0" consists of the last bit of the segment "Sn" and the first bit of the segment "S(n+1)" which are positioned at the boundary of the segments. The portion of the reproduced signal waveform "A" which corresponds to 2 bits (the shaded portion in the figure) is picked out. Next, the data of the portion is compared to each of the 2-bit reference waveform data patterns "0" "0"; "0" "1"; "1" "0" and "1" "1", which are pre-stored in memory, to operate correlation coefficients. Finally, by confirming that the correlation coefficient is the greatest with respect to the 2-bit reference waveform data pattern "1" "0", the matching of the patterns at the boundary of the segments is confirmed.

Although the pattern matching for several bits over adjacent segments at the segment boundary can also be performed for all the segment boundaries, it may be better to perform the pattern matching when the greatest correlation coefficient operated by pattern matching for the segment "Sn" is an extraordinary low value.

Method for Determining Matching of Segments Using Polarity of Correlation Coefficient In general, when the data of the starting points of the reference data patterns which correspond to the character codes are set to have the same polarity, the greatest correlation coefficient operated by pattern matching for each segment will be a positive value when the starting peak of the waveform pattern of the cleaved segment "Sn" and the starting peak of the reference waveform data pattern have the same polarity (right position), and that will be a negative value when the starting peaks have different polarities (invert position). By using this property, it can be determined whether or not the segmentation of the reproduced waveform signal is normal.

Figure 12:
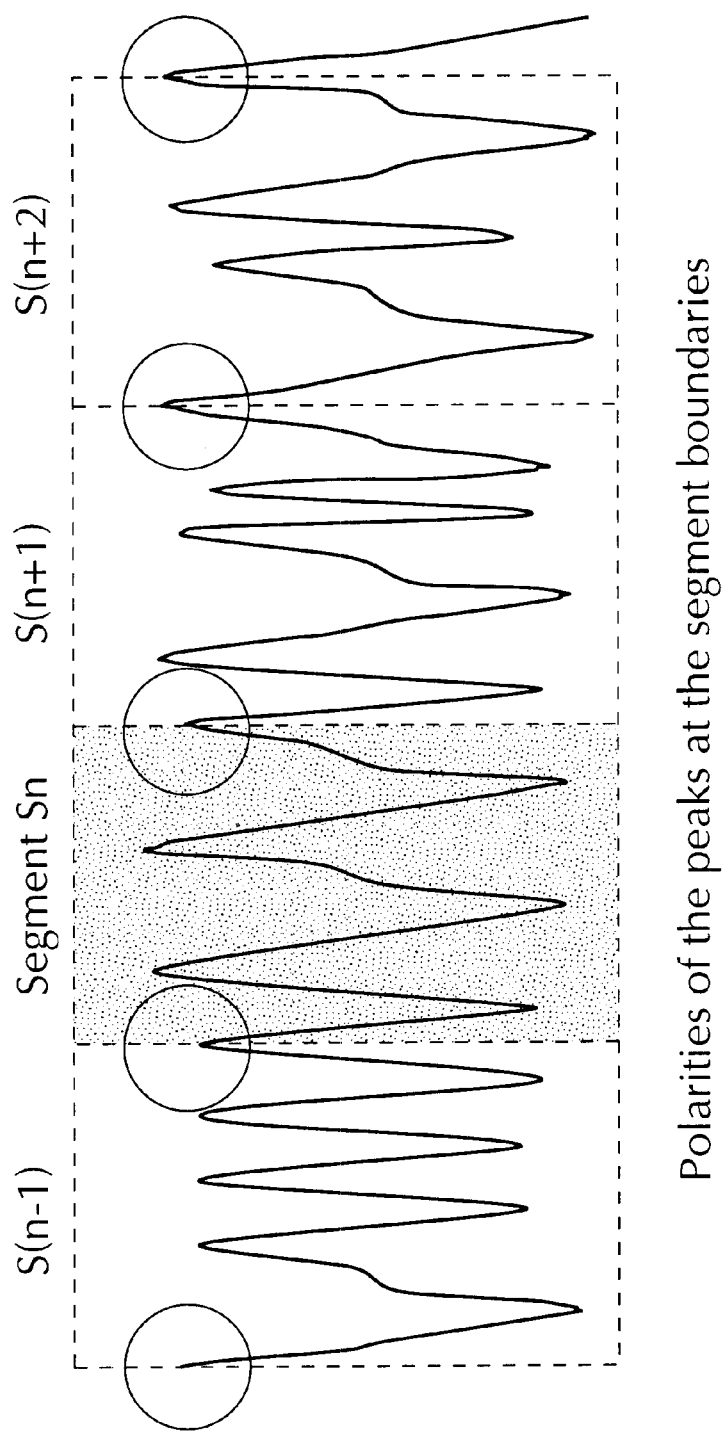
FIG. 12 is a signal waveform diagram of the polarities of the peak points at the boundaries between segments from the reproduced signal waveform in the pattern matching.

The above will be described in other words referring to FIG. 12. When the parity bit of the 5-bit code system (4 data bits+1 parity bit) uses an odd parity, the polarities of the starting peak point and. ending peak point of the reproduced waveform signal that corresponds to one character become the same regardless of the character code. Therefore, the polarities of the starting points of the segments "Sn" are always of a positive value or a negative value, but never in both positive and negative values.

Consequently the greatest correlation coefficient in each of the segments "Sn" is always either a positive value (right position) or a negative value (invert position). By determining which value the greatest correlation coefficient is in at pattern matching, the accuracy of the pattern matching can be increased. In other words, when the polarity of the greatest correlation coefficient determined by pattern matching changes, it can be determined that some errors have occurred in segmentation. In such a case, the segmentation may be performed again.

On the other hand, when the parity bit uses an even parity in the 5-bit code system, the polarities of the starting peak point and ending peak point of the reproduced waveform signal that corresponds to one character become opposite regardless of character code. Therefore, the polarities of starting points of the segments "Sn" appear as alternate values of positive and negative, but never appear successively as a positive or negative value. Taking advantage of this property, the polarities of the greatest correlation coefficients of adjacent segments are compared to one another in the same manner as that of the odd parity to detect whether or not the segmentation was performed properly.

It is understood that the determination of matching of the segmentation by identifying polarity of the greatest correlation coefficient of each segment can be extensively used not only for the 5-bit code system, but also for the n-bit code system.

In the above description, each segment "Sn" from the reproduced signal waveform is subjected to the pattern matching to decode the recorded data. However, a conventional method for decoding the recorded data based on the detection of the peak points of the reproduced signal waveform can be combined with a decoding method by pattern matching of the present invention.

Also the reference waveform data pattern can be simply defined as a straight line of a simple slope connecting the peak points of the waveform pattern or an assembly of the straight lines of the simple slope, instead of being defined by the collection of data obtained by equation operation. Further, the similarity can be also defined not only by correlation coefficient, but also as the absolute value of the difference between the points of the reproduced signal waveform data and the reference waveform data. In such a case, it is necessary to normalize the amplitude of the segment data cleaved form the reproduced signal waveform with the amplitude of the reference waveform data.

As described above, a method for demodulating magnetically recorded data of the present invention decodes (the data) by dividing the analog reproduced signal waveform into segments, each of which corresponds to the length of one character of the recorded data, identifying the degree of similarity of (the data) of each segment with the reference waveform data allocated to each character, and by determining that the segment is a character.code corresponding to the reference waveform data having the highest similarity with the segment.

Therefore, according to the data demodulating method of the present invention, unlike the conventional method in which a demodulating operation is performed based on the peak points of the reproduced waveform signal, the data can be read accurately even when abnormal peaks caused by noise appear in a portion of the reproduced signal waveform or the peaks are missing due to poor reproduction. Also, even with a magnetic recording medium in which the output is considerably decreased, the recorded data thereof can be accurately read by the data demodulating method of the present invention.

Furthermore, according to the data decoding method of the present invention, the data is demodulated by pattern matching performed by a unit of one character. Therefore, even when distortions or abnormal peaks appear in a portion of the reproduced signal waveform, for example, decoding is less affected by the abnormal portion compared to the pattern matching by a unit of bit. Consequently the magnetically recorded data can be read very accurately on the whole.

What is claimed is:

1. The method for demodulating magnetically recorded data in which binary data bits are defined by a pulse width modulated signal made up of a combination of high and low widths and in which each character is defined by a plurality of data bits, comprising the steps of:

storing a set of predetermined idealized reference signal waveforms, each member of the set representing a character, detecting magnetically recorded data from a magnetic medium with a magnetic head to create a signal representing said magnetically recorded data, dividing said signal into a plurality of segments, each of said segments having a width in data bits equal to one character, comparing the signal waveform of each of said segments as a target segment to each of said stored reference waveforms by pattern matching to determine a degree of similarity between the target segment and each of said stored reference waveforms, and designating the character represented by said reference waveform having the highest degree of similarity as the character represented by the target segment.

2. The method of claim 1 wherein said step of pattern matching involves the use of a correlation coefficient to determine the degree of similarity between the segment being compared and the set of reference waveforms.

3. The method of claim 2 wherein absolute values of said correlation coefficients are the criteria used for said step of pattern matching.

4. The method of claim 1 further comprising the steps of:

associating with each of said target segments, first and second shifted test segments to provide a set of three associated segments, each of said test segments being a segment that is shifted by a predetermined amount from said test segment, in said step of comparing, determining said degree of similarity for each of said set of three associated segments, said step of designating involving the character represented by said reference waveform that has the highest degree of similarity to any one of said three associated segments as the character represented by the target segment.

5. The method of claim 1 wherein:

peak points at which said reproduced signal is segmented into a unit of length equivalent to one character of said recorded data is set such that starting point and ending point of each segment are the peak points in the signal waveform of said reproduced signal;

the data length of said segment is compressed or decompressed so as to agree with the data length of each reference waveform data; and said segment is compared with each of said reference waveform data.

6. The method of claim 5 wherein: Ns represents the number of arbitrary units of the width of a target segment Sn, and Nt represents the number of said arbitrary units of a reference waveform, further comprising the steps of:

deleting data points from said segment Sn when Ns is greater than Nt, and adding said data points to said segment Sn when Ns is less than Nt.

7. The method of claim 2 wherein:

regarding two adjacent segments, the degree of similarity with each reference waveform data is determined; and based on the polarity of the greatest correlation coefficient of each of said adjacent segments, it is determined whether or not the boundaries of said segment in said reproduced signal are false.

8. The method of claim 7 wherein:

when the parity bit in a 5-bit code is an odd parity, it is detected whether or not the polarity of the starting peak point and that of the ending peak point of said reproduced signal equivalent to one character coincide with one another; and when the parity bit in said 5-bit code is an even parity, it is detected whether or not the polarity of the starting peak point and that of the ending peak point of the reproduced signal equivalent to one character differ from one another.

9. The method of claim 1 wherein:

regarding at least two adjacent segments, the degrees of similarities with each of said reference waveform data are determined;

at least two characters respectively corresponding to the reference waveform data showing the highest similarities are determined as characters expressed by said at least two adjacent segments; and the portion of said signal waveform of said reproduced signal which is equivalent to two or more bits having a boundary of segments in the center is compared to ideal reproduced signal waveform data patterns of binary data "0" and "1" pre-stored in memory through pattern matching to determine which binary data "0" or "1" each of said bits shows; and based on the detection whether or not the determined binary data for each of said bits coincides with the binary data for each bit corresponding to each character expressed by each segment, it is determined whether or not the characters allocated to said adjacent segments are proper.

10. The method for demodulating magnetically recorded data as set forth in claim 1 wherein:

prior to said recorded data, a sync bit region which is composed of a plurality of bits of simple frequency and an STX code region are arranged;

the portion of the signal waveform of said reproduced signal corresponding to said sync bit region and said STX code region is compared by pattern matching by 2 bits to ideal reproduced signal waveforms of binary data for 2 bits pre-stored in memory to determine which binary data "0" or "1" said portion shows;

based on said comparison result, the starting position of said recorded data is detected.

11. The method for demodulating magnetically recorded data as set forth in claim 10 wherein:

said signal waveform of said reproduced signal is compared by 2 bits to ideal reproduced signal waveforms of 2-bit data "0""0" and "0""1", which are prepared in advance, by shifting 2-bit segments by one bit in pattern matching; and based on the position of the data "1" when said data "0""0" changes to "0""1", the starting position of said recorded data is detected.

12. Apparatus for demodulating magnetically recorded data in which binary data bits are defined by a pulse width modulated signal made up of a combination of high and low widths and in which each character is defined by a plurality of data bits, comprising:

a first memory containing a set of predetermined idealized reference signal waveforms, each member of the set representing a character, a magnetic detector adapted to be coupled to a magnetic medium to generate a signal representing magnetically recorded data on the medium, a data segmenting circuit responsive to said signal to provide a plurality of segments for said signal, each of said segments having a width in data bits equal to one character, a matcher for comparing the waveform of each of said segments as a target segment to each of said reference waveforms in said first memory, by pattern matching to provide a similarity parameter between the target segment and each of said stored reference waveforms, and a data identification means to provide the character represented by said reference waveform that has the highest similarity parameter as the character represented by the target segment.

13. The apparatus of claim 12 wherein said comparator employs a correlation coefficient to provide said similarity parameter.

14. The apparatus of claim 13 wherein the absolute values of said correlation coefficients are employed to provide said parameter.

15. The method for demodulating magnetically recorded data in which binary data bits are defined by a pulse width modulated signal made up of a combination of high and low widths and in which each character is defined by a plurality of data bits, comprising the steps of:

storing a set of predetermined idealized reference signal waveforms, each member of the set representing a character, detecting magnetically recorded data from a magnetic medium with a magnetic head to create a signal representing said magnetically recorded data, dividing said signal into a plurality of segments, each of said segments having a width in data bits equal to one character, comparing the signal waveform of each of said segments as a target segment to each of said stored reference waveforms by pattern matching to determine a degree of similarity between the target segment and each of said stored reference waveforms, and designating the character represented by said reference waveform having the highest degree of similarity as the character represented by the target segment, wherein:

regarding at least two adjacent segments, the degrees of similarities with each of said reference waveform data are determined;

at least two characters respectively corresponding to the reference waveform data showing the highest similarities are determined as characters expressed by said at least two adjacent segments; and the portion of said signal waveform of said reproduced signal which is equivalent to two or more bits having a boundary of segments in the center is compared to ideal reproduced signal waveform data patterns of binary data "0" and "1" pre-stored in memory through pattern matching to determine which binary data "0" or "1" each of said bits shows; and based on the detection whether or not the determined binary data for each of said bits coincides with the binary data for each bit corresponding to each character expressed by each segment, it is determined whether or not the characters allocated to said adjacent segments are proper.

16. A method for determining characters from magnetically recorded data in which each character is defined by a plurality of data bits, comprising:

reading a segment of a magnetically recorded data from a magnetic medium with a magnetic head to create a waveform signal representing a portion of the magnetically recorded data, the segment containing one character;

comparing the waveform signal with each member of a set of stored reference waveforms, each member of the set representing a character;

designating the character represented by the reference waveform having the highest similarity to the waveform signal from the comparison as the character represented by the segment.

* * * * *